US006833861B2

(12) United States Patent
Matsumoto et al.

(10) Patent No.: US 6,833,861 B2
(45) Date of Patent: Dec. 21, 2004

(54) SYSTEM FOR TRANSFERRING IMAGE DATA FROM A CAMERA TO A PRINTING SYSTEM

(75) Inventors: Nobuo Matsumoto, Kanagawa (JP); Naoto Kinjo, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 59 days.

(21) Appl. No.: 09/350,376

(22) Filed: Jul. 9, 1999

(65) Prior Publication Data

US 2003/0174213 A1 Sep. 18, 2003

Related U.S. Application Data

(63) Continuation of application No. 09/350,376, filed on Jul. 9, 1999, which is a continuation of application No. 09/041,661, filed on Mar. 13, 1998, now abandoned.

(30) Foreign Application Priority Data

Mar. 25, 1997 (JP) ............................................ 9-072008

(51) Int. Cl.[7] ........................... H04N 5/225; H04N 5/76
(52) U.S. Cl. ................................. 348/207.2; 348/231.3
(58) Field of Search ........................... 348/14.12, 207.2, 348/222, 231–233, 2, 333.01, 333.02, 333.05, 333.11, 333.12, 373, 375, 376, 552; 358/500, 501, 502, 505, 513, 527; 386/46, 95, 107, 108, 109, 112, 117, 118; 396/297, 299, 300

(56) References Cited

U.S. PATENT DOCUMENTS 5,194,892 A * 3/1993 Robison ...................... 355/40
5,296,884 A * 3/1994 Honda ........................ 396/311
5,477,353 A 12/1995 Yamasaki ................... 358/487
5,479,228 A * 12/1995 Tamamura .................. 396/319
5,488,558 A * 1/1996 Ohki .......................... 701/207
5,512,396 A 4/1996 Hicks .......................... 430/21
5,574,533 A 11/1996 Itoh ........................... 396/639
5,606,365 A * 2/1997 Maurinus .................... 348/222
5,625,411 A * 4/1997 Inuiya ..................... 348/220.1
5,666,578 A * 9/1997 Oikawa ...................... 396/319
5,754,227 A 5/1998 Fukuoka ..................... 348/232
5,757,388 A 5/1998 Stephenson .................... 347/2
5,768,633 A * 6/1998 Allen ............................ 396/2
5,798,738 A 8/1998 Yamada ...................... 345/2.3
5,799,219 A * 8/1998 Moghadam ................. 396/319
5,806,005 A * 9/1998 Hull ........................ 348/14.12
5,926,285 A * 7/1999 Takahashi ................... 358/296
6,000,864 A * 12/1999 Hanada ....................... 400/62
6,011,547 A * 1/2000 Shiota ........................ 382/254
6,018,774 A * 1/2000 Mayle ........................ 709/250
6,069,712 A * 5/2000 Dellert ....................... 358/408
6,133,947 A * 10/2000 Mikuni ....................... 348/143
6,141,482 A * 10/2000 Massarksy .................. 386/118
2003/0025808 A1 * 2/2003 Parulski et al. ........ 348/231.99

* cited by examiner

*Primary Examiner*—Ngoc-Yen Vu
(74) *Attorney, Agent, or Firm*—Sughrue Mion, PLLC

(57) ABSTRACT

A digital still camera is provided with a data communication section which transfers image data of a picture frame photographed by the digital still camera to a printing equipment through a radio telephony channel each time the picture frame is photographed. The data communication section sends ID data consisting of a user ID number and a frame ID number and print order data as along with the image data. In the printing equipment, the received image data and ID data is stored as database in a memory. Based on the image data read from the database, a printer makes hard copies in conditions designated by the print order data. The hard copies are delivered to a place appointed by the print order data.

18 Claims, 5 Drawing Sheets

DATA TERMINAL
KEY INPUT
DATA COMPRESSOR
CONTROL DATA GENERATOR
IMAGE MEMORY
17a
17b
SYSTEM CONTROLLER
IMAGING SECTION
IMAGE PROCESSOR
DIGITAL PRINTER
BILL PRINTER
DATABASE MEMORY
SYSTEM CONTROLLER
DATA CONVERTER
MODEM
9
10
11
12
13
14
15
16
17
18
19
20
21
30
31
32
33
34
35
36

45
44
PAPER PROCESSOR
1
42
1
43
32
PRINT - EXPOSURE SECTION
40
41
IMAGE DATA 49
53
20
DATA TERMINAL
19
22
SENDING DATA MEMORY
CONTROL DATA GENERATOR
21
KEY INPUT
18
DATA COMPRESSOR
50
51
IMAGE DISPLAY CKT
17
IMAGE MEMORY
SYSTEM CONTROLLER
52
LCD PANEL
16
IMAGE PROCESSOR
14
15
IMAGING SECTION

BUFFER MEMORY
ADDRESS DECODER
RETRANSFER DATA GENERATOR
RETRANSFER FILE PRODUCER
DATA CONVERTER
MODEM
SYSTEM CONTROLLER
DATA CONVERTER
MODEM
RECEPTION EQUIPMENT
DIGITAL STILL CAMERA
PRINTING EQUIPMENT
PRINTING EQUIPMENT
DIGITAL STILL CAMERA
60
61
62
63
64
65
66
67
70
71
72
73
75
11
10
49

SYSTEM FOR TRANSFERRING IMAGE DATA FROM A CAMERA TO A PRINTING SYSTEM

This is a continuation of Application Ser. No. 09/350,376 filed Jul. 9, 1999, which is a continuation of Application Ser. No. 09/041,661, filed Mar. 13, 1998 now abandoned, the disclosures of which are incorporated herein by reference.

BACKGROUND OF THE INVENTION

1. Field of the Invention

The present invention relates to a printing system for making a print based on image data of a picture frame photographed by a camera, and a camera for use with the printing system.

2. Background Arts

According to the conventional photo film development and printing system, a user takes exposed photo film to a photofinisher or its agency, and receives the developed photo film and subsequent photo prints at the photofinisher or the agency. Therefore, the user has to go to the photofinisher or the agency at least twice for one order. If the user does not want to print all picture frames on a photo filmstrip, but wants to sort out some picture frames to print, the user must order the development only to check all picture frames on the developed photo film, and then order printing of designated picture frames. Then, the user has to go to the photofinisher or the agency at least four times till the user gets the photo prints of the designated picture frames.

In electronic or digital still cameras, a recording medium for storing image data of photographed images, such as a floppy disc or an LSI memory card, is loaded instead of the photo film. To make a print from the image data, the recording medium is set in an in-house printer, or is forwarded to a photofinisher. Photo prints made through the in-house printer are inferior in quality. Taking the recording medium to the photofinisher is time-consuming for the user, in the same way as set forth above with respect to the photo film.

Whether it is the photo film camera or the digital still camera, the user must carry or prepare many photo filmstrips or recording media, i.e., floppy discs or LSI memory cards, for taking many picture frames on one occasion.

SUMMARY OF THE INVENTION

In view of the foregoing, an object of the present invention is to provide a printing system which provides high-quality photo prints, saves time for ordering and getting prints, and wherein the user does not need to use a lot of photo film strips or recording media, nor to forward them to a photofinisher.

Another object of the present invention is to provide a camera for use with the printing system of the present invention.

To achieve the above object, a printing system according to the present invention is comprised of a data receiving device installed in a printing equipment, for receiving image data and ID data of the image data sent from a camera, image database for managing the image data from the data receiving device based on the ID data, a printing device for printing out a hard copy based on the image data read from the memory means, and a controlling device for controlling the printing means in accordance with print order data.

According to the present invention, a camera is comprised of an imaging device for picking up image data from a subject; and a data terminal device for sending the image data of one frame after another along with ID data of each frame to a data receiving device of a printing equipment, and print order data defining printing conditions of each frame.

Because image data of photographed frames is transferred from a camera to a printing equipment, the camera does not need any image data recording medium, but has only to have a small capacity image memory enough to store image data of one or several frames. The user of the camera does not need to take the image data recording medium or the photo film cartridge to a photofinisher's agency or the like for printing. On the photofinisher side, the printing system of the present invention makes it possible to automatize receiving and managing the print orders, as well as operating the printing device.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limitative of the present invention, wherein like reference numerals designate like or corresponding parts throughout the several views, and wherein.

DETAILED DESCRIPTION OF THE PREFERRED EMBODIMENT

Figure 1:
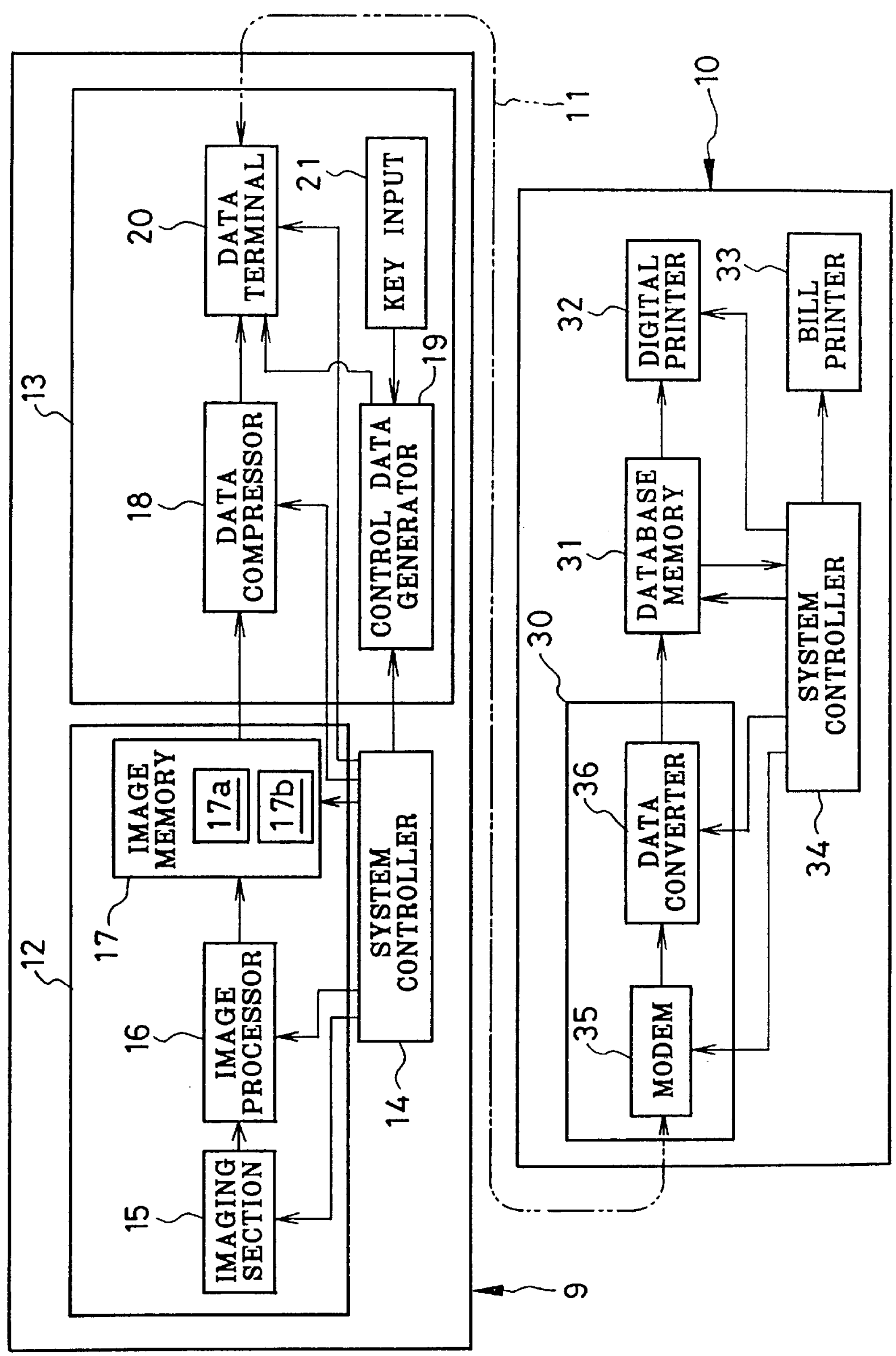
FIG. 1 is a block diagram of a printing system consisting of a digital still camera and a printing equipment, according to an embodiment of the invention.

In a printing system of FIG. 1, a digital still camera 9 and a printing equipment 10 are connected through a radio communication channel 11. The digital still camera 9 consists of a camera section 12, a data communication section 13 and a system controller 14 for controlling them.

The camera section 12 is constituted of an imaging section 15, an image processor 16, and an image memory 17. The imaging section 15 has a triple-plate type image area sensor for picking up three color analog image signals from a subject. The image processor 16 subjects the analog image signals to well-known image processing steps like gamma-conversion, and converts the image signals into digital image data. The image data is temporarily stored in the image memory 17 that consists of two frame memories 17*a* and 17*b*. While the image data of one picture frame is written in one of the frame memories 17*a* and 17*b*, the image data of another picture frame written in the other frame memory is sent to a data compressor 18 of the data communication section 13. Hereinafter, the image data of one picture frame will be referred to as frame image data.

The data communication section 13 is constituted of the data compressor 18, a control data generator 19, and a data terminal 20. The data compressor 18 reads out the frame image data from one of the frame memories 17*a* and 17*b*, and compresses the frame image data at a ratio of 1/10 to 1/20, by use of the JPEG (Joint Photographic Experts Group) method or any other appropriate data compression method. The compressed frame image data is sent to the data terminal 20.

The control data generator 19 generates user ID data for identifying the user of the digital still camera 9, frame ID data for correlating each picture frame with the compressed frame image data, and print order data that represents various commands entered through a key input 21. The ID data and print order data is sent as control data to the data terminal 20. The data terminal 20 sends the compressed image data sequentially to the printing equipment 10 of a photofinisher through the radio communication channel 11, along with the control data. The photofinisher is previously registered in the digital still camera 9. In the present embodiment, the radio communication channel 11 is that for radio telephony. Therefore, the data terminal 20 consists of a modem and a radio sender-receiver for sending and receiving data through the radio telephony. The data terminal 20 is provided with a connector for allowing linkage to a public telephone network or another digital communication network.

The print order data or commands entered through the key input 21 may include an order for an index print, an order for individual frame printing, print size, requisite number of prints, and print delivery commands for designating the way of receiving the photo prints, i.e., the date and place the user wishes to receive the photo prints, and the way of delivery: mail or home delivery service etc. As the printing commands, there may be an order for a special size print, such as a panoramic print, an order for trimming, an order for preserving the image data in a database of the photofinisher, and a command of designating a memory medium for the image data. Once the contents of the print order data are set up through the key input 21, the contents are stored in a memory of the control data generator 19. Thus, the control data generator 19 outputs the same contents as the print order data unless they are revised.

The frame image data and the control data are automatically sent to the printing equipment 10 each time the frame image data and the related control data is obtained through the above described operations in the digital still camera 9, i.e., imaging, image processing, image data storing, data compressing, and command data entry through the key input 21. Since there is no need for recording image data on a recording medium by the digital still camera 9, the user can photograph as many picture frames as he or she wants without any restriction and interruption.

The printing equipment 10 is constituted of a data communication section 30, a database memory 31, a digital printer 32, a bill printer 33 and a system controller 34.

The data communication section 30 consists of a modem 35 and a data converter 36 for converting or decoding the data from the modem 35 into the image data and the control data. The system controller 34 writes the image data and the control data in the database memory 31, wherein the ID data is used for data retrieval.

The system controller 34 controls the digital printer 32 in accordance with the print order data, such as the individual frame printing order, the index print order, the print size and the requisite number of prints. First, the system controller 34 reads the date and time the user wishes to receive the prints, and starts reading the frame image data sequentially from the most urgent to the lest urgent picture frames.

Figure 2:
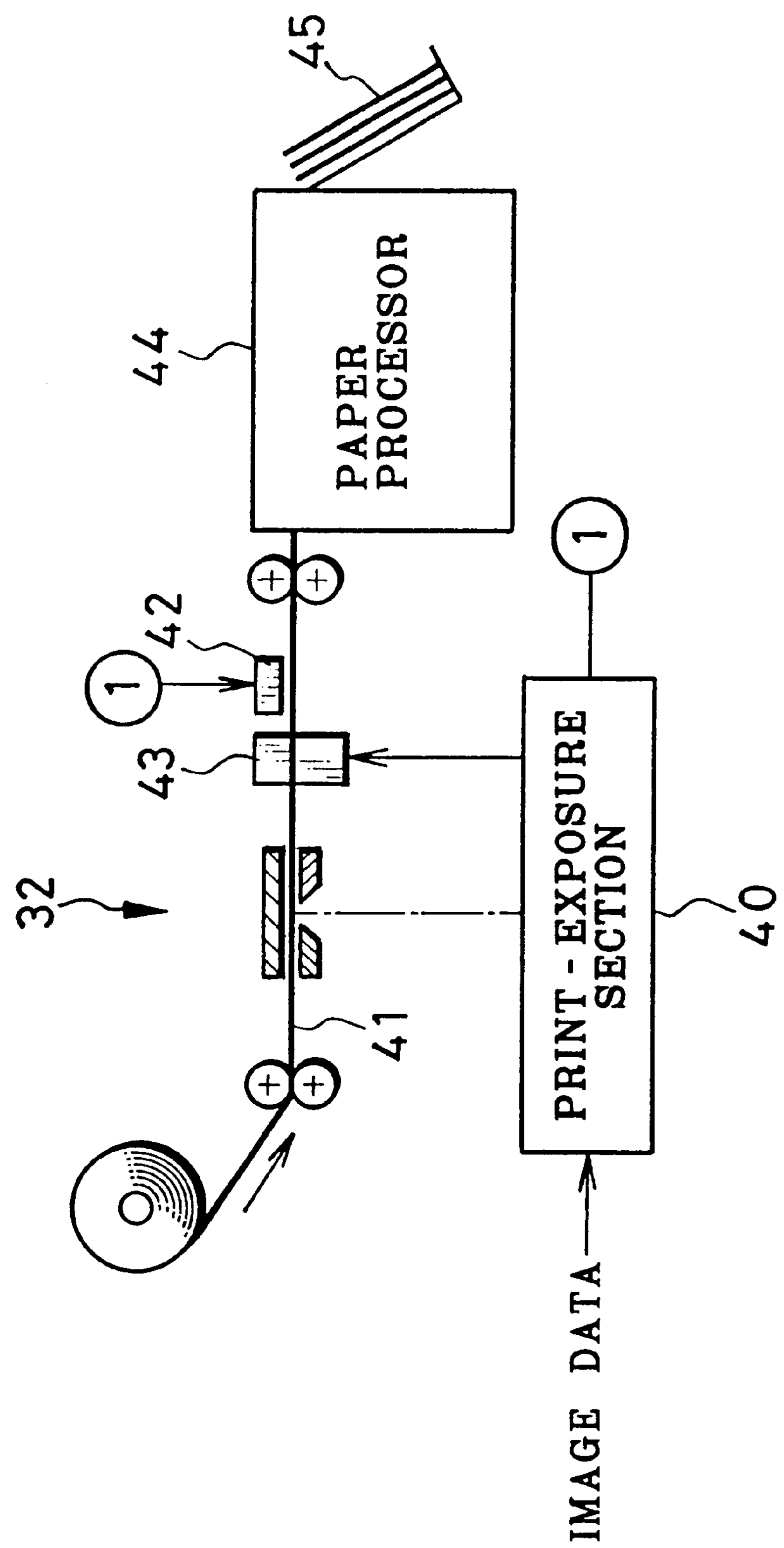
FIG. 2 is a schematic diagram of a digital printer used in the printing equipment of FIG. 1.

As shown in FIG. 2, the digital printer 32 has a print-exposure section 40 that scans a color silver-salt photographic material or color paper 41 with a Laser beam in a cross direction of the color paper 41, while the color paper 41 is transported in its lengthwise direction. Thereby, each picture frame is printed in a frame exposure area on the color paper 41, when the individual frame printing is ordered. When the index printing is ordered, a plurality of picture frames of a reduced size are printed in the frame exposure area.

A back-printer 42 prints an ID number and a corresponding bar code on the backside of the color paper 41 for each printed picture frame. In addition, a mark provider 43, e.g., a puncher, provides a cut mark between adjacent printed picture frames. The color paper 41 having the picture frame printed thereon is developed and processed in a paper processor 44, and is cut at the cut mark into a hard copy 45 of the individual picture frame. The ID number and the bar code printed by the back-printer 42 are utilized for identifying the hard copies 45 in a delivery process as set forth below.

The system controller 34 calculates a charge for the printing according to the contents of printing process, and outputs the charge to a bill printer 33. The bill printer 33 determines users' name by the ID number, and prints out a bill containing the user's name, the date and time of delivery, the place of delivery, the charge, and other necessary information about the finished prints. The bill printer 33 also prints the ID number and its bar code on the bill, so the bill can be mechanically correlated with the hard copies 45 having the same ID number and bar code. The correlated hard copies 45 and the bill are enclosed in a delivery envelope, and delivered to the user the way appointed by the print delivery commands of the print order data.

If the system controller 34 reads the image data preservation command out of the print order data, the concerned frame image data is stored for a given period in the database memory 31. If not, the frame image data is deleted from the database memory 31 when the requisite number of prints or hard copies 45 are made based on the frame image data. The user can retrieve or download the frame image data from the database memory 31 by way of the digital still camera 9 or a personal computer or another data terminal. For this purpose, the data communication section 13 of the digital still camera 9 can access the database memory 31 to retrieve the image data of the picture frames photographed before by the digital still camera 9. These picture frames are seriatim displayed on an electronic viewfinder or a display panel of the camera 9 or on a display device connected to the camera 9.

If the print order data includes the command of designating a data memory medium for the image data, the system controller 34 writes the image data in a large capacity data memory medium, e.g. MO, CD-ROM, MD, and deletes the corresponding image data from the database memory 31.

In the above embodiment, the data communication section 13 is integrated into the digital still camera 9, but the data communication section 13 may be separate from the camera section 12. It is also possible to provide the data communication section 13 with a voice transmission device, so the data communication section 13 functions as a cellular phone.

Although print order data is entered by the key input 21, and is transferred along with image data to the printing equipment 10 in the above embodiment, it is possible to enter customized printing commands in advance in the registered photofinisher. In that case, the user makes a request to the photofinisher for modifying the customized printing commands by phone or the like whenever the user wants.

It is also possible to transfer photographic condition data along with the frame image data. The photographic condition data may include the date and time of photography, the focal length used, the subject distance, the kind of illumination source, the weather and the temperature. The photographic condition data may be used for improving quality of the photo prints. For the reprinting, the user has only to transfer the ID data of the concerned picture frame and the requisite number of prints from the camera 9 to the printing equipment 10 since the frame image data is already forwarded to the printing equipment.

Figure 3:
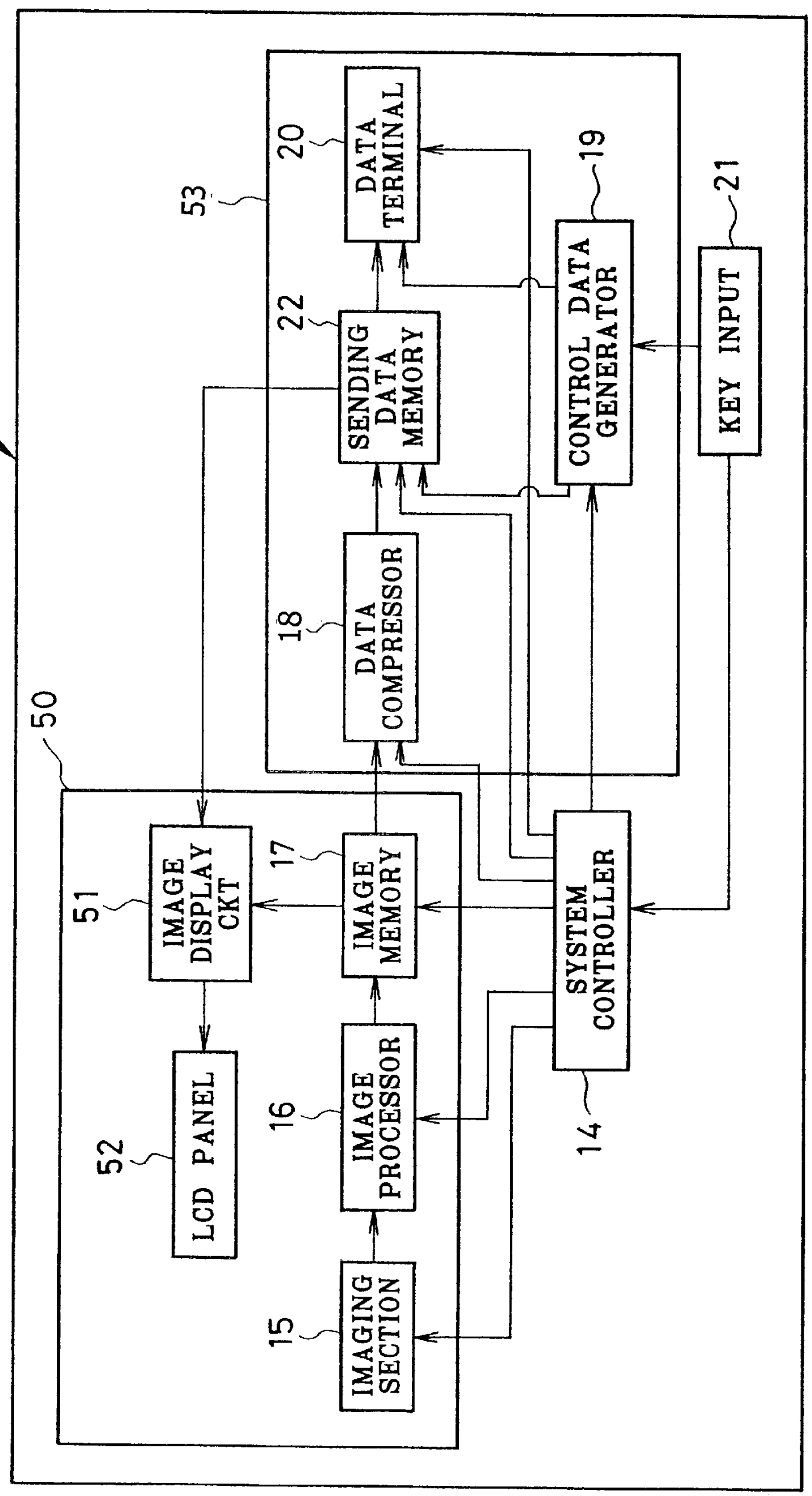
FIG. 3 is a block diagram of a digital still camera according to another embodiment of the invention.

Instead of transferring the frame image data and the control data to the printing equipment 10 after each frame is photographed, it is possible to transfer the data after a plurality of picture frames are photographed. FIG. 3 shows a digital still camera 49 for this embodiment, which is provided with a sending data memory 22 for storing compressed image data of a plurality of picture frames. The sending data memory 22 is connected between a data compressor 16 and a data terminal 20 of a data communication section 13, and stores the individual frame image data in association with the print order data. In addition, a camera body 50 is provided with an image display circuit 51 and an LCD panel 52, the user can confirm the photographed image on the LCD panel 52.

The sending data memory 22 stores the user ID number and the telephone number of the registered photofinisher, besides the image data and the print order data. The user ID number and the photofinisher's telephone number may be stored in a built-in memory of a system controller 14, instead of the sending data memory 22. The user ID number may be associated with the individual frame image data, like the frame ID data and the print order data, or may be transferred as footer of a data block consisting of the image data, the frame ID data and the print order data of a given number of picture frames. It is preferable to associate the user ID number with the individual frame image data, because it would be unnecessary to transfer the whole data block once again even if the data communication is interrupted for some reasons like radio noise or radio propagation blockage. The user ID number may also be combined with the frame ID number.

Figure 4:
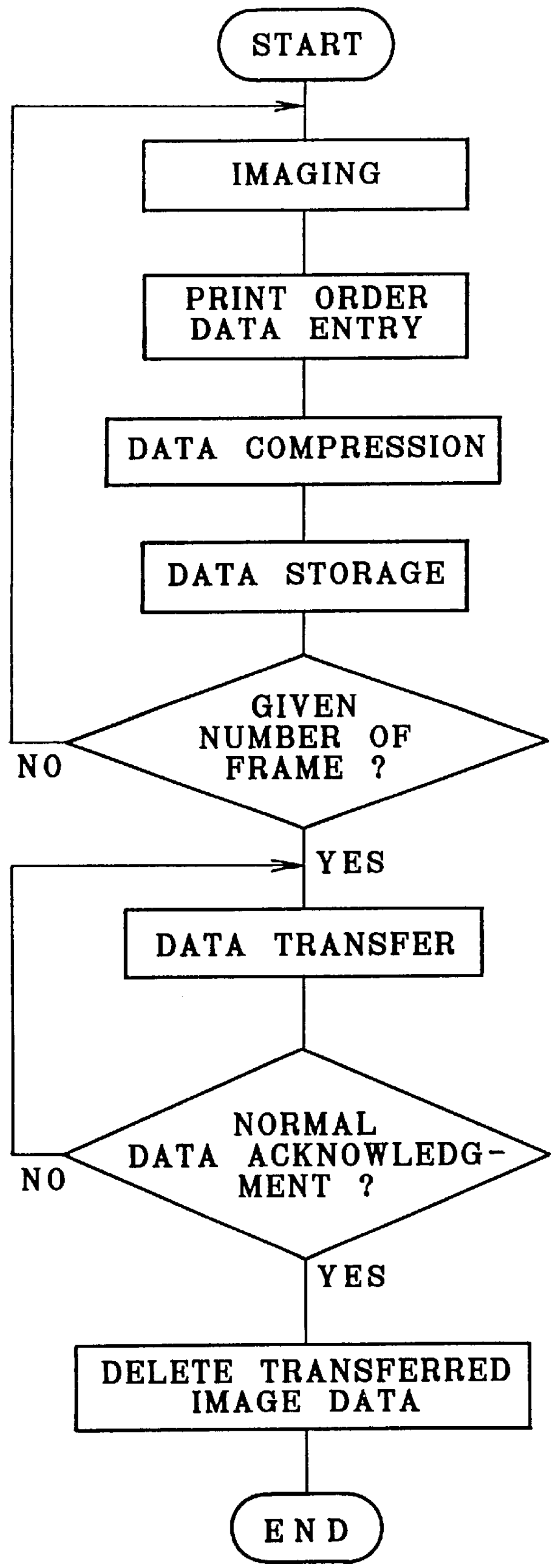
FIG. 4 is a flow chart of an operation sequence of the digital still camera of FIG. 3.

As shown in FIG. 4, each time the data of the individual picture frame is normally transferred to the printing equipment 10, the printing equipment 10 sends back a normal data acknowledgment signal. If the digital still camera 49 does not receive the normal data acknowledgment signal in a given time, the digital still camera 49 sends out the data of the concerned picture frame again. Instead of sending the data of the individual picture frame repeatedly until the digital still camera 49 receives the normal acknowledgment signal, it is possible to limit the number of available repeats of sending, and give an alarm when it comes to the limit.

According to the embodiment of FIG. 4, the digital still camera 49 starts transferring the data to the printing equipment 10 when a predetermined number of picture frames have been photographed. As an alternative, it is possible to start transferring the data when a given amount of data is stored in the sending data memory 22. It is also possible to start transferring the data a given time after the latest picture frame is photographed. The digital still camera 49 is preferably provided with a manual transfer mode where the user may transfer the data at an appropriate time. It is preferable that the digital still camera 49 is automatically set in a transfer standby mode when it is located in those areas where the data communication is impossible. In the transfer standby mode, the digital still camera 49 automatically starts transferring the data when it goes out of the communication impossible area.

Upon receipt of the normal data acknowledgment signal, the digital still camera 49 writes data transfer records in a predetermined memory location of the sending data memory 22, and thereafter deletes the transferred image data from the sending data memory 22. The data transfer records include the date and time of sending, the frame ID data of the picture frame of the transferred frame image data, the print delivery commands included in the print order data, and the like. It is possible to delete the transferred image data in response to a manually entered command. Instead of the normal data acknowledgment signal, the photofinisher may send back a reception number to the digital still camera 49. Then, the reception number is stored in the sending data memory 22.

Figure 5:
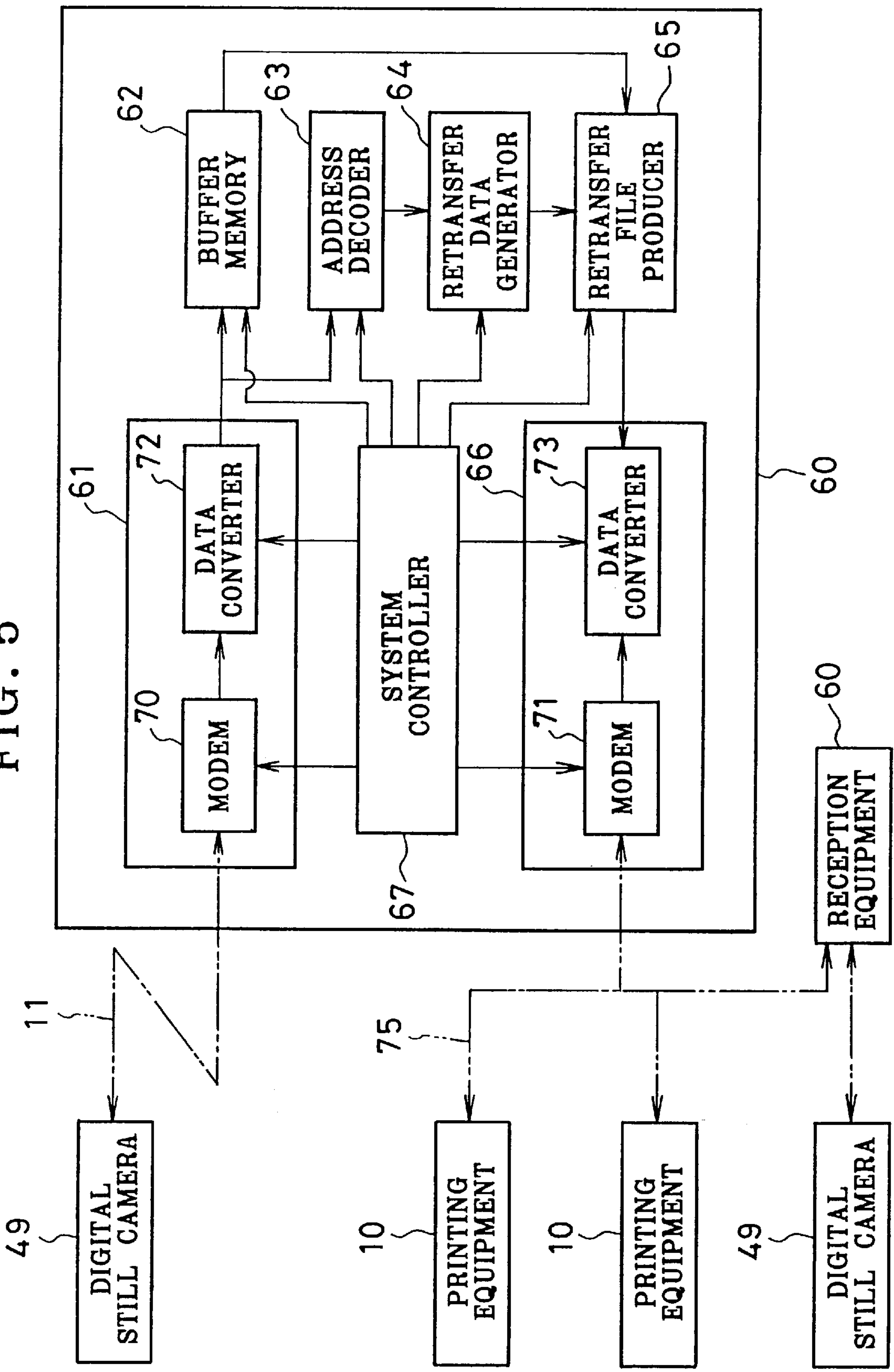
FIG. 5 is a block diagram of a printing system consisting of the digital still cameras of FIG. 3, the printing equipments of FIG. 1, and intermediate reception equipments.

It is possible to store addresses of a plurality of photo labs in the sending data memory 22, so the user can select one of the photo labs. In this embodiment, a reception equipment 60 is installed in each geographical area, e.g., in an area agency of a photofinisher, as shown in FIG. 5. The reception equipment 60 is provided with a data receiver 61, a buffer memory 62, an address decoder 63, a retransfer data generator 64, a retransfer file producer 65, a data sender 66 and a system controller 67. The data receiving section 61 consists of a modem 70 and a data converter 72, and the data sender 66 consists of a modem 71 and a data converter 73.

The data from the digital still camera 49 is received on the data receiver 61, and is stored in the buffer memory 62. The data receiver 61 also sends the received data to the address decoder 63. The address decoder 63 decodes the address of the delivery place appointed by the user, that is included in the print delivery commands of the received data. The address decoder 63 sends the decoded address along with the ID data to the retransfer data generator 64. The retransfer data generator 64 produces retransfer address data from the decoded address, and sends it along with the ID data to the retransfer file producer 65. The retransfer file producer 65 reads out the image data and the print order data from the buffer memory 62, correlates the retransfer address data with the image data and the print order data by use of the ID data, to produce a retransfer data file from the correlated data. Thereby, the data sender 66 sends the retransfer data file to a printing equipment 10 located nearest to the appointed delivery place through a leased or private line 75. Accordingly, the finished prints are delivered to the appointed place in the shortest time. It is, of course, possible to use a public data communication network for sending the retransfer file, instead of the private line 75.

Alternatively, the digital still camera 49 or the reception equipment 60 may automatically select the nearest printing equipment 10 to the present location of the digital still camera 49. As the present location of the digital still camera 49, a place name may be entered through a key input 21 of the digital still camera 49. In that case, it is preferable to store a table for correlating place names with the addresses of the printing equipment 10 of the respective geographical areas, so the nearest printing equipment 10 to the present location of the camera 49 is selected based on the place name entered through the key input 21. It is also possible to provide the digital still camera 49 with a receiver for the global positioning system (GPS), so the camera 49 finds the present location by the GPS signal, and determines based on the present location the address to send the data. The data communication section 13 may be designed to receive information about radio base stations, so the user may use the address of the nearest radio base station as the present location of the digital still camera 49.

Selecting the nearest printing equipment 10 to the present location of the camera 49 is preferable in terms of cutting down on data communication bills. It is possible to display on the LCD panel 52 an address list of those printing equipments 10 which are placed near by the present location of the digital still camera 49, so the user may choose an appropriate one.

The delivery place of the print delivery commands may be the user's home, the nearest photo shop or photofinisher's agency to the user's home, or another place appointed by the user. For designating the delivery place, it is preferable to memorize address data of available delivery places in association with place names, so the user may choose an appropriate one of those delivery places which are near by the location represented by the place name entered through the key input 21. In that case, the delivery places may be displayed on the LCD panel 52. The user may enter not only the place name of the present location of the digital still camera 49, but also any appropriate place name. Since it is possible to appoint the date and time of delivery as well as the delivery place, the user may receive the finished prints in the most suitable way, e.g. at a photo shop nearby a hotel where the user is staying on a trip.

It is, of course, possible for the digital still camera 49 to select automatically a delivery place among from the registered delivery places based on the present location of the camera 49, that may be entered as a place name, or may be determined by the GPS signal or the signals from the radio base stations.

The image data may be transferred without being compressed, though the data transfer efficiency is lowered. It is also possible to sort out those picture frames whose image data should be transferred, by inspecting the picture frame after each photography on the LCD panel 52.

It is possible to obtain high resolution image data by the pixel-shifting, wherein a plurality of picture frames are photographed from a subject in rapid succession while the image area sensor of the imaging section 15 is shifting by a unit less than one pixel on the image plane by use of piezoelectric elements or the like. Then, position data of the shifted pixels is transferred as coordinate values to the photofinisher, along with the corresponding image data. Since the picture frames obtained by the pixel-shifting from the same subject are highly correlated with each other, it is preferable to code differences between these picture frames for the data compression, rather than coding the image data of each individual picture frame. Thereby, the data amount necessary to transfer and store is reduced. The photofinisher may produce an image of virtually higher resolution than available by the image area sensor from the image data of the pixel-shifted picture frames and the position data of the shifted pixels by decoding the transferred differential image data and interpolating the pixels. If necessary, the image data is treated with other image processing steps such as smoothing and enhancement.

The present invention is applicable to a video camera. Video image data of one frame is almost equal to that of preceding and succeeding frames. So long as the subject of the video camera is completely stationary, noises that may be caused in the circuit between the image input device and the image recording device can be eliminated efficiently by averaging video image data of a plurality of frames during that period. If the subject is moving within a limited range, the same effect as the above pixel-shifting may be obtained from the video image data. That is, image data of one frame to print may be interpolated by use of image data of the preceding and succeeding frames, so that a virtually high resolution image is obtained by the image interpolation. In that case, the direction and distance of movement of corresponding pixels on an image area sensor can be determined based on local matching between the frames. For example, when the corresponding pixels between a first frame and a second frame that is a several number of frames after the first frame move by an amount (dx, dy) on the image area sensor, the pixel-shifting amount between two successive frames may be considered (dx/n, dy/n), wherein n is a difference between the frame serial number of the first frame and that of the second frame, and dx is an amount of movement in a horizontal axis direction, whereas dy is an amount of movement in a vertical axis direction. Image data of those frames whose pixel-shifting amounts (dx/n, dy/n) are not integral numbers are utilized for the image interpolation.

Although the digital printer 32 is used in the above embodiments, it is possible to use a heat-developed image transfer type color printer, a color ink-jet printer, a color thermosensitive type printer, or a color Laser printer. Instead of or besides the image data, it is possible to transfer word data or text data, which may be input in a word processor, a personal computer or the like, to the photofinisher through a data communication network, e.g., a personal computer network. Based on the word data or text data, the photofinisher may make a synthetic print containing characters merged in a photographed image, or may print the characters on the backside of the hard copy 45 by use of the back-printer 42.

The printing system of the present invention is useful for transferring data from a professional photographer of a news organ to its headquarter. It is also possible to construct a digital still camera to be attachable with an IC memory card, so the image data is written on the IC memory card. In that case, the user may forward the IC memory card to an appropriate photo shop for printing, or may transfer the image data from the IC memory card to a photofinisher through a data terminal installed in the most convenient photofinisher's agency for the user. The IC memory card should store data about the user, such as a user ID number or user's address and name.

Thus the present invention is not to be limited to the above embodiments but, on the contrary, various modifications may be possible without departing from the scope of claims attached hereto.

What is claimed is:

1. An imaging system for making an image print based on transmitted image data, comprising a printing system and a camera, wherein said camera comprises:

an imaging device detecting image data from a subject; and a transmitter transmitting the image data along with ID data identifying individual image frames of the image data and along with print order data defining printing conditions for the individual image frames of the image data;

wherein said printing system comprises:

a data receiving device receiving the image data, the ID data and the print order data transmitted from said transmitter within said camera; and a printing device making image prints of the individual image frames in accordance with the ID data and the print order data;

wherein said camera is configured to photograph a series of frames of the subject according to a pixel-shifting method; and wherein data of differences between the series of frames is coded for transmission to said printing system via said transmitter.

2. An imaging system according to claim 1, wherein said printing system further comprises a control device which controls the writing of the image data into a database memory within said printing system, the reading of the image data from said database memory based on the ID data, and the printing of the image prints based on the print order data.

3. An imaging system according to claim 1, wherein the image data is transmitted to said data receiving device via a radio communication channel.

4. An imaging system according to claim 1, wherein photographic condition data is transmitted along with the image data from said transmitter to said data receiving device.

5. An imaging system according to claim 4, wherein the photographic condition data comprises at least one of date information, time information, focal length information, distance-to-subject information, exposure information, illumination information, weather condition information, and temperature condition information.

6. An imaging system according to claim 1, wherein the ID data comprises a user ID number and a frame ID number.

7. An imaging system according to claim 1, wherein the print order data includes print delivery data, and the image prints are delivered to an order sender at a place appointed by the delivery data.

8. An imaging system according to claim 1, wherein said camera stores a plurality of registered printing locations, and the print order data includes a selected one of the plurality of registered printing locations, and further wherein the selected one of the plurality of registered printing locations is closest to said camera of all the registered printing locations.

9. An imaging system according to claim 1, wherein the present location of the camera is determined by data entered by a user, or a signal from a radio base station or a global positioning system.

10. An imaging system according to claim 1, wherein said camera further comprises a memory device storing the image data of a plurality of frames, and wherein said transmitter starts transmitting the image data of the plurality of frames after a predetermined number of frames are photographed or after a predetermined amount of image data is stored in said memory device.

11. An imaging system according to claim 1, wherein said printing system transmits a confirmation signal upon normal receipt of the image data by said printing system, and wherein said camera deletes the image data of a plurality of frames stored in said memory device when said transmitter receives the confirmation signal from said printing system.

12. An imaging system according to claim 1, wherein said camera further comprises a key input through which a user of said camera enters the print order data into the camera.

13. An imaging system according to claim 1, wherein the print order data comprises at least one of: a quantity of prints, an index print request, and a print format request.

14. An imaging system according to claim 1, wherein the print order data comprises at least one of a request to preserve the image data in a database of said printing system, a request to preserve the image data on a transportable memory medium, or a request to transmit the image data to a designated database external to said printing system.

15. An imaging system according to claim 1, wherein said printing system stores customized printing instructions for said camera, and wherein the print order data transmitted by said camera comprises either a confirmation or a modification of the customized printing instructions.

16. A method, comprising:

recording an image with a camera as image data;

transmitting the image data and control data from the camera over a telecommunications medium to a printing system that is remote from the camera, wherein the control data includes ID data identifying image frames of the image data and image data print order instructions;

receiving the image data and the control data at the printing system;

printing the image data at the printing system in accordance with the ID data identifying image frames of the image data and the print order instructions;

wherein a series of frames of a subject is photographed by the camera according to a pixel-shifting method; and wherein data of differences between the series of frames is coded for transmission to the printing system via a transmitter.

17. The method according to claim 16, further comprising entering the print order instructions into the camera prior to said transmitting.

18. The method according to claim 16, wherein the print order instructions comprise at least one of: a quantity of prints, an index print request, and a print format request.

* * * * *